Figure 1:
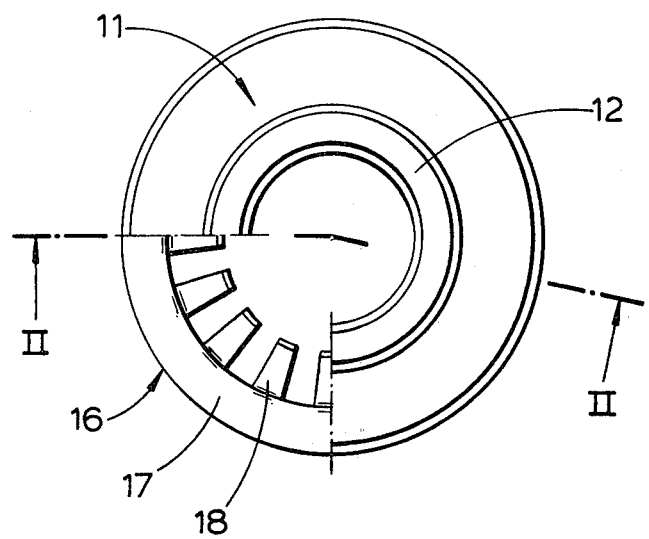

United States Patent [19]

Fitzpatrick-Ellis

[11] 4,319,757
[45] Mar. 16, 1982

[54] END FACE THRUST SEALS

[75] Inventor: John F. Fitzpatrick-Ellis, Warwick, England

[73] Assignee: Automotive Products Limited, Warwickshire, England

[21] Appl. No.: 164,174

[22] Filed: Jun. 30, 1980

[30] Foreign Application Priority Data

Jul. 5, 1979 [GB] United Kingdom ............... 23436/79

[51] Int. Cl.³ .............................................. F16J 15/34
[52] U.S. Cl. .................................. 277/81 R; 277/166; 277/178; 277/183; 277/189
[58] Field of Search .................. 277/81 R, 166, 167.3, 277/178, 179, 181–186, 189

[56] References Cited

U.S. PATENT DOCUMENTS

| 1,546,942 | 7/1925 | Roth | 277/186 |
| 2,519,436 | 8/1950 | Cadman | 277/183 X |
| 3,243,240 | 3/1966 | Arthur | 277/178 X |
| 4,041,241 | 8/1977 | Olmstead et al. | 277/178 X |

FOREIGN PATENT DOCUMENTS

| 1077014 | 3/1960 | Fed. Rep. of Germany | 277/178 |
| 522720 | 6/1940 | United Kingdom . | |
| 594502 | 11/1947 | United Kingdom . | |
| 713602 | 8/1954 | United Kingdom . | |
| 727135 | 3/1955 | United Kingdom . | |
| 752266 | 7/1956 | United Kingdom | 277/81 |
| 837814 | 6/1960 | United Kingdom . | |

Primary Examiner—Robert S. Ward, Jr.
Attorney, Agent, or Firm—Kemon & Estabrook

[57] ABSTRACT

An end face thrust seal, particularly for an automobile water pump, and comprising an annular elastomeric ring having inner and outer rims interconnected by a frustoconical portion. A diaphragm spring is embedded in the elastomeric ring so that the outer annular portion of the spring is at the outer rim, and the spring fingers extend inwards forming a frustoconical spring in the frustoconical portion of the elastomeric ring. The fingers extend into the inner rim and the inner portions thereof are bent to extend axially away from the base of the cone and re-inforce the inner rim.

8 Claims, 2 Drawing Figures

END FACE THRUST SEALS

This invention relates to end face thrust seals for use between relatively rotatable parts and in particular but not exclusively, to such seals to be used in automobile water pumps.

In a motor vehicle water pump, the impeller drive shaft is typically rotatable in a bearing mounted in the housing of the impeller. The bearing must be sealed against leakage from the pressure side of the impeller.

An end face seal having a construction similar to the herein disclosed invention, is described in U.S. Pat. No. 2,560,557. The therein disclosed seal includes an elastomeric sealing ring having its inner and outer rims interconnected by a frustoconical diaphragm portion. Moulded into the elastomeric ring is a re-inforcing ring of spring metal which includes a ring flange in the outer rim, a ring flange in the inner rim and interconnecting yielding spring fingers connecting the two flanges through the frustoconical diaphragm portion. When the seal is put under axial load the fingers distort deforming the diaphragm and constantly urge the inner and outer rims axially apart.

A disadvantage of this construction is that the ring flanges in the rim provide a solid support for the fingers and therefore all distortions are accommodated by the frustoconical spring fingers which may distort anywhere along the length of each respective finger depending upon the manner in which the distorting load is applied to the end face of the seal. Hence the seal may behave in an unpredictable manner because it is not possible to predict how it will distort under load.

It is the object of the present invention to provide an end face seal that overcomes the above disadvantage.

Accordingly there is provided an end face seal for use between relatively rotatable parts and comprising an annular elastomeric ring having inner and outer peripheral rims linked by a frustoconical portion extending therebetween and having a diaphragm spring embedded in the ring with a continuous outer annular portion at the outer rim and spring fingers extending radially inwards forming a frustoconical spring in the frustoconical portion of the elastomeric ring characterised in that the fingers extend into the inner rim and the inner end portions of the fingers are bent to extend axially away from the base of the cone and re-inforce the inner rim.

Preferably the outer continuous portion of the diaphragm spring is a radial flange and the portion of the fingers adjacent the flange extends axially in the inner rim of elastomeric ring.

The term "diaphragm spring" is well known in the art of automobile friction clutches and is a frustoconical annular spring having a continuous outer annular margin from the inner periphery of which spaced spring fingers project radially inwards.

Figure 2:
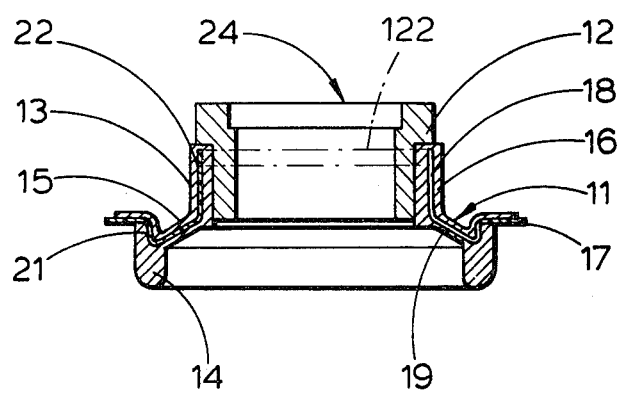

The invention will be described by way of example and with reference to the following drawings in which:

FIG. 1 is a plan view of an end thrust seal according to this invention showing in one quadrant the elastomer removed to reveal the diaphragm spring; and FIG. 2 is a section on the line II—II of FIG. 1.

With reference to FIGS. 1 and 2 of the drawings the end thrust seal comprises an annular elastomeric ring 11 and a cylindrical bearing ring 12. The elastomeric ring 11 can be made from any suitable rubber compound and in particular it has been found that an ethylene propylene rubber is suitable. The bearing ring 12 is made from a hard plastics material such as graphite filled phenol formaldehyde moulded compounds eg. "Bakelite" (Registered Trade Mark) and polyimide or aramide resins sold as Vespel (Registered Trade Mark).

The elastomeric ring 11 has an inner peripheral rim 13 and an outer peripheral rim 14 linked together by a frustoconical portion 15 extending therebetween.

The inner rim 13 of the ring 11 has a tubular axial extension (axial with respect to the axis of rotation of the shaft) which is a push fit to grip onto the tubular bearing ring 12 through the centre of which an impeller shaft (not shown) passes. The extended rim 13 grips a substantial proportion (over 50%) of the length of the bearing ring 12. The end face 24 of the bearing ring 12 provides a contact surface with a co-operating surface on the impeller (not shown) so as to seal a leak path around the impeller drive shaft. The outer rim 14 extends in the axially opposite direction to the inner rim 13 and provides a large outer peripheral seal area for the rim to seal against the housing.

The elastomeric ring 11 has an annular diaphragm spring 16 embedded therein. The spring is moulded out of glass fibre filled nylon 66 but it could for example be pressed from sheet spring steel. The spring has a continuous outer annular portion 17 formed as a radial flange from the inner peripheral edge of which spaced fingers 18 extend radially inwards. The fingers 18 have an outer portion 21 adjacent the flange 17 and extending away from the bearing ring 12, a frustoconical portion 19 extending back towards the bearing ring 12, and an inner axial portion 22 extending towards the bearing ring 12.

The flange 17 provides an abutment which helps to locate the seal when the seal is pushed into an aperture in an impeller housing (not shown). The outer axial portion 21 of the fingers 18 re-inforces the outer rim 14. The frustoconical portion 19 supports the frustoconical portion 15 of the elastomeric ring 11, and the inner axial portion 22 (ie the inner ends of the spring fingers) is embedded in and co-extensive with substantially the whole axial length of the extended inner rim 13. The fingers 18 in the inner rim 13 provide a resilient reinforcement for the rim 13 to grip the bearing 12.

In use the outer rim 14 is a tight push fit into a surrounding aperture in a motor vehicle water pump housing. The end face seal is pushed into the aperture until the flange 17 abuts the surrounding surfaces. The end face 24 of the bearing ring 12 contacts the water pump impeller (not shown) and an axial load is exerted by the impeller against the bearing ring 12. This load is resisted by the fingers 18 supported by the rim 14 in its surrounding aperture. The shaped fingers 18 urge the inner and outer rims 13 and 14, respectively, axially apart to thrust the face 24 against a co-operating surface on the impeller (not shown).

The shape of the fingers 18 is important in holding the end face under an even load against the impeller. Because the fingers 18 are bent the fingers will tend to deform at the bends when under an axial load and therefore the deformation becomes more predictable than in the prior art.

The bends between the inner portion of the finger 22 and the frustoconical portion 19, and between the frustoconical portion 19, and the outer axial portion 21 are particularly important. They allow the spring fingers to flex within the elastomeric moulding without buckling, all the deformation being taken at the above mentioned bends, whilst the frustoconical portion 19 of the spring provides much of the resilience.

It has been found that the inner end of the fingers 18 can be formed in a very narrow continuous ring having a width of no more than one third the length of the inner end portion 122 of the fingers. This still allows the fingers 18 to move radially and axially, but greatly facilitates the moulding techniques for a Nylon 66 spring.

I claim:

1. An end face thrust seal for use between relatively rotatable parts and comprising:

an annular elastomeric ring having inner and outer peripheral rims linked by a frustoconical portion extending therebetween;

a diaphragm spring embedded in the elastomeric ring and having a continuous outer annular portion with a series of spaced spring fingers extending radially inwards and forming a frustoconical spring;

said outer annular portion being located at the outer rim of the elastomeric ring and the frustoconical spring being located in the frustoconical portion of the elastomeric ring;

and the spring fingers extend into the inner rim and have inner end portions that are bent to extend axially away from the base of the cone and re-inforce the inner rim.

2. A seal as claimed in claim 1, wherein the inner rim has an axial tubular portion extending away from the base of the cone and the inner ends of the spring fingers are formed to be co-extensive with substantially the whole length of the tubular portion.

3. A seal as claimed in claim 1, wherein the outer continuous portion of the diaphragm spring is a radial flange and that portion of the fingers adjacent the flange extends axially in the inner rim of the elastomeric ring.

4. A seal as claimed in claim 3, wherein said portion of fingers adjacent the flange extends axially in the opposite direction to the inner ends of the spring fingers and supports the outer rim of the elastomeric ring which also extends axially in the opposite direction to the inner ends of the spring finger.

5. A seal as claimed in claim 4, wherein the diaphragm spring is formed from moulded glass filled nylon resin.

6. A seal as claimed in claim 5, wherein the inner ends of the spring fingers are interconnected to facilitate moulding of the spring.

7. A seal as claimed in claim 3, wherein the annular portion of the diaphragm spring projects radially out of the outer rim of the elastomeric ring to provide an abutment when the seal is located in use.

8. A seal as claimed in claim 2, wherein the radially inner rim carries a bearing ring therein, said bearing ring in use resting against the surface with which the seal co-operates.

* * * * *